United States Patent
Shen et al.

(10) Patent No.: US 9,509,632 B2
(45) Date of Patent: Nov. 29, 2016

(54) WORKLOAD PREDICTION FOR NETWORK-BASED COMPUTING

(75) Inventors: Zhen Shen, Beijing (CN); Xuefeng Song, Hebei (CN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 562 days.

(21) Appl. No.: 13/876,558

(22) PCT Filed: Apr. 25, 2012

(86) PCT No.: PCT/CN2012/074659
§ 371 (c)(1),
(2), (4) Date: Mar. 28, 2013

(87) PCT Pub. No.: WO2013/159291
PCT Pub. Date: Oct. 31, 2013

(65) Prior Publication Data
US 2014/0229610 A1    Aug. 14, 2014

(51) Int. Cl.
*H04L 12/26* (2006.01)
*H04L 12/911* (2013.01)
*H04L 29/08* (2006.01)
*H04L 12/24* (2006.01)
*G06F 9/50* (2006.01)
(Continued)

(52) U.S. Cl.
CPC ............ *H04L 47/823* (2013.01); *G06F 9/505* (2013.01); *H04L 41/147* (2013.01); *H04L 43/50* (2013.01); *H04L 67/1023* (2013.01); *H04L 67/1031* (2013.01); *G06F 9/50* (2013.01); *G06F 15/173* (2013.01); *G06F 2209/5019* (2013.01); *G06Q 10/06* (2013.01); *H04L 12/1485* (2013.01); *H04L 41/5096* (2013.01)

(58) Field of Classification Search
USPC ....................................................... 709/226
See application file for complete search history.

(56) References Cited

U.S. PATENT DOCUMENTS

| 6,351,775 B1 | 2/2002 | Yu | |
| 2004/0111307 A1* | 6/2004 | Demsky | G06Q 10/06 705/7.24 |

(Continued)

FOREIGN PATENT DOCUMENTS

| CN | 102004671 A | 4/2011 |
| CN | 102104496 A | 6/2011 |

OTHER PUBLICATIONS

International Search Report mailed Jan. 17, 2013 for International App. No. PCT/CN2012/074659, 12 pages.

(Continued)

*Primary Examiner* — Chris Parry
*Assistant Examiner* — Caroline Jahnige
(74) *Attorney, Agent, or Firm* — Amin, Turocy & Watson, LLP

(57) ABSTRACT

Technologies are generally described for systems and methods effective to efficiently schedule a workload in a cloud computing system. In one example, calendar data is collected from respective sets of devices associated with respective sets of subscribers and a workload to be performed at a specific time or range of time is predicted based in part on an analysis of calendar data. Moreover, timing data associated with a set of predicted requests is determined based on the analysis and at least a portion of cloud computing resources that service the set of predicted requests are dynamically scheduled based on timing data.

35 Claims, 13 Drawing Sheets

(51) Int. Cl.
  *G06F 15/173* (2006.01)
  *H04L 12/14* (2006.01)
  *G06Q 10/06* (2012.01)

(56) References Cited

U.S. PATENT DOCUMENTS

| | | | |
|---|---|---|---|
| 2005/0041580 A1 | 2/2005 | Petrovykh | |
| 2006/0277294 A1 | 12/2006 | Kanevsky et al. | |
| 2008/0184248 A1* | 7/2008 | Barua | G06F 9/4843 718/104 |
| 2008/0215742 A1 | 9/2008 | Goldszmidt et al. | |
| 2009/0029692 A1* | 1/2009 | Radermacher | H04M 3/42127 455/418 |
| 2009/0265568 A1* | 10/2009 | Jackson | G06F 1/3203 713/320 |
| 2010/0011094 A1* | 1/2010 | Ver Steeg | H04L 29/12933 709/220 |
| 2010/0229185 A1* | 9/2010 | Howarth | H04L 12/2602 719/318 |
| 2010/0257015 A1 | 10/2010 | Molander | |
| 2010/0262695 A1* | 10/2010 | Mays | G06F 9/5027 709/226 |
| 2012/0072762 A1* | 3/2012 | Atchison | G06F 9/5072 714/2 |
| 2012/0096165 A1* | 4/2012 | Madduri | G06F 9/5011 709/226 |

OTHER PUBLICATIONS

"Zazu, Inc. Announces Launch of Zazu Mornings(TM) Integrated With Connected Devices," Zazu, Inc., accessed at [http://www.virtualizationconference.com/node/197788], posted on Sep. 13, 2011, retrieved on Jan. 19, 2015, pp. 1-10.

Hobbs, S., "The New Local: Location Based, Social Centric & Behaviorally Targeted," accessed at the Wayback Machine (archived page dated Jan. 25, 2012) [http://web.archive.org/web/20120125084801/http://www.localsearchinsider.org/the-new-local-location-based-social-centric-behaviorally-targeted/archives/], posted on Feb. 9, 2010, retrieved on Jan. 27, 2015, pp. 1-3.

* cited by examiner

WORKLOAD PREDICTION FOR NETWORK-BASED COMPUTING

CROSS-REFERENCE TO RELATED APPLICATION

The present application is a US national stage application under 35 U.S.C. §371 of PCT Application No. PCT/CN2012/074659, filed Apr. 25, 2012, and entitled "WORKLOAD PREDICTION FOR NETWORK-BASED COMPUTING," the disclosure of which is incorporated herein by reference in its entirety.

TECHNICAL FIELD

The subject disclosure relates generally to workload prediction for network-based computing.

BACKGROUND

Cloud/network-based computing provides a highly scalable, flexible and cost-effective, shared computing infrastructure that delivers multiple services based on resource multiplexing. As an example, these services can be broadly divided into three categories: Infrastructure-as-a-Service (IaaS), Platform-as-a-Service (PaaS) and Software-as-a-Service (SaaS). Typically, a large number of applications are hosted by the shared computing infrastructure that can be accessed by multiple users via multiple devices. Moreover, the shared computing infrastructure can include shared resources such as computers, servers, and/or data storage systems that facilitate hosting and/or execution of the applications. Management of the shared resource to increase system efficiency and performance is a challenging task. Moreover, conventional approaches inefficiently manage resources and are substantially expensive.

The above-described deficiencies of traditional approaches merely provide an overview of some of the problems of conventional approaches and techniques, and are not intended to be exhaustive. Other problems with conventional systems and techniques, and corresponding benefits of the various non-limiting embodiments described herein may become further apparent upon review of the following description.

SUMMARY

One or more embodiments disclosed herein relate to a method that includes collecting calendar data from respective sets of devices associated with respective sets of subscribers and predicting a workload to be performed at a specific time or range of time based in part on an analysis of the calendar data. Further, in one embodiment, a system that includes a memory and at least one processor, communicatively coupled to the memory is disclosed. The processor facilitates execution of one or more computer-executable components, comprising a data collection component configured to obtain calendar data from a set of devices associated with a subscriber, and a resource management component configured to dynamically schedule at least a portion of a set of servers based in part on the calendar data, to facilitate provision of service for a request from a device of the set of devices.

In one embodiment, a computer-readable storage medium having stored thereon computer-executable instructions is disclosed herein. The computer-executable instructions, in response to execution, cause a computing system including at least one processor to perform operations, comprising analyzing calendar data received from respective sets of devices associated with respective sets of subscribers, identifying timing data associated with a set of predicted requests based on the analyzing, and dynamically scheduling at least a portion of a set of servers that process the set of predicted requests based on the identifying.

In another embodiment, a communication device comprising a memory and at least one processor, communicatively coupled to the memory, is disclosed herein. The processor facilitates execution of at least one computer-executable component that at least transmits calendar data to a communication network, wherein the calendar data is utilized to dynamically schedule a subset of a set of servers within the communication network, and directs a request to the communication network, subsequent to transmission of the calendar data, wherein the request is serviced by the subset of the set of servers. Further, in yet another embodiment, a method comprising receiving a request from a device and dynamically determining a subset of a set of servers to process the request based on calendar data that is received from the device prior to the receiving, is disclosed herein.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
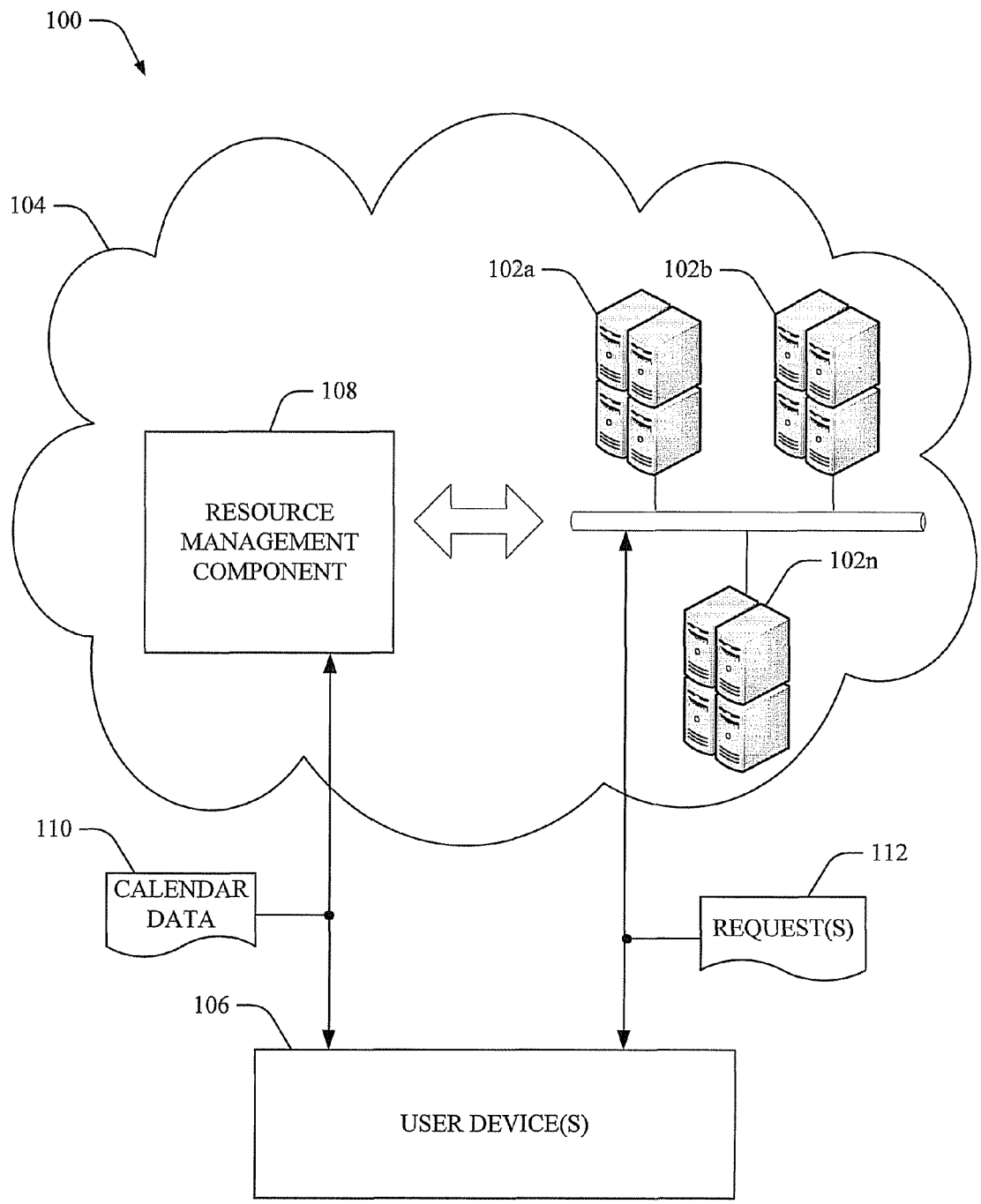
FIG. 1 illustrates a non-limiting embodiment of an example system configured for resource management in a cloud computing environment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the disclosure, as generally described herein, and illustrated in the Figures, can be arranged, substituted, combined, separated, and designed in a wide variety of different configurations, all of which are explicitly contemplated herein.

In various non-limiting embodiments, systems and methods are provided for scheduling a workload (e.g., allocating resources) of a cloud computing system. The workload can be determined, in advance, based on an analysis of calendar data that is received from a set of devices associated with one or more subscribers. As an example, the calendar data can provide schedule-related or timing-related information that can be utilized to identify a time or time range at/during which a request for a service can be received from the one or more subscribers. At least a portion of servers within the cloud computing system can be dynamically scheduled based in part on the workload, to facilitate provision of the service.

The foregoing overview is illustrative only and is not intended to be in any way limiting. In addition to the illustrative aspects, embodiments, and features described above, further aspects, embodiments, and features will become apparent by reference to the drawings and the following detailed description.

In a cloud computing infrastructure, networked servers service requests received from multiple computing devices of multiple customers. Resource management associated with the networked servers can be challenging since the timing of the requests is not known in advance. Various embodiments disclosed herein utilize calendar data, collected from a user's device, to determine timing data associated with the requests, which can facilitate efficient resource management based on the timing data. It is noted that the term "cloud" as used herein can refer to a set of servers, communicatively and/or operatively coupled to each other, that host a set of applications utilized for servicing user requests. In general, the cloud computing resources can communicate with user devices via most any wired and/or wireless communication network to provide access to services that are based in the cloud and not stored locally (e.g., on the user device). A typical cloud computing environment can include multiple layers, aggregated together, that interact with each other to provide resources for end-users.

FIG. 1 illustrates a non-limiting embodiment of an example system 100 configured for resource management in a cloud computing system. Moreover, system 100 facilitates scheduling resources ($102_1$-$102_n$; wherein n can be any natural number) within a cloud computing infrastructure 104 to increase load balancing efficiency and overall system performance. Typically, resources ($102_1$-$102_n$) are shared by multiple users (customers, subscribers, consumers, etc.) and are utilized to process user requests, received from a set of user devices 106 associated with the multiple users.

In one embodiment, system 100 includes a resource management component 108 that can facilitate workload identification and resource allocation and/or scheduling. According to an aspect, resource management component 108 can receive calendar data 110 from one or more user devices 106 and identify a workload based on an analysis of calendar data 110. Moreover, resource management component 108 can calculate timing data associated with receipt of a request 112 in advance by utilizing calendar data 110. By way of example, the timing data can include a time (e.g., Monday at 07:30 AM) at which and/or a time period (e.g., Tuesday from 08:00 AM to 11:00 AM) during which a user device, such as one of the user devices 106 is likely to send request(s) 112 (e.g., planned or predictable requests) to cloud computing infrastructure 104. Additionally or optionally, resource management component 108 can employ statistical prediction tools (e.g., Bayesian networks, neural networks, etc.) to verify and/or increase accuracy of the timing data that is generated based on calendar data 110.

To avoid and/or reduce inefficient utilization of resources ($102_1$-$102_n$), resource management component 108 can dynamically schedule and/or allocate resources based on the identified workload. In one aspect, resource management component 108 can control power management features associated with a set of resources ($102_1$-$102_n$). For example, resource management component 108 can change a power-related mode, such as, but not limited to, a low-power mode, a standby mode, a power off mode, a power on mode, etc., of the set of resources ($102_1$-$102_n$), as a function of a current workload.

In addition, resource management component 108 can allocate a portion of resources ($102_1$-$102_n$) for servicing request(s) 112 that are received from user device(s) 106 and can allocate the remaining portion of resources ($102_1$-$102_n$) for servicing an unplanned, unpredictable, and/or random request(s) (not shown) that are received, for example, from subscribers (not shown) that do not share their calendar data. In one example, the portion of resources ($102_1$-$102_n$) allocated for servicing request(s) 112 can respond relatively slowly as compared to the remaining portion of resources ($102_1$-$102_n$) allocated for servicing the unplanned, unpredictable, and/or random requests. However, a fee associated with servicing request(s) 112 can be lower than a fee charged for servicing the unplanned and/or random request(s). As an example, resource management component 108 can facilitate power management for the portion of resources ($102_1$-$102_n$) allocated for servicing request(s) 112, whereas, the remaining portion of resources ($102_1$-$102_n$) allocated for servicing the unplanned and/or random requests can be kept in an "always-on" mode to provide a fast response.

In one aspect, although resource management component 108 is depicted to reside within cloud computing infrastructure 104, the subject specification is not so limited and it is noted that resource management component 108 can be external to and/or communicatively coupled to cloud computing infrastructure 104. In one example, resource management component 108 can be implemented by one or more resources ($102_1$-$102_n$). Further, it can be noted that a "user" of the cloud computing infrastructure 104 is not limited to an individual, and can include enterprises or other entities. Moreover, calendar information of the enterprises and/or entities can also be collected and used for prediction of the workload, for example, by system 100.

Figure 2:
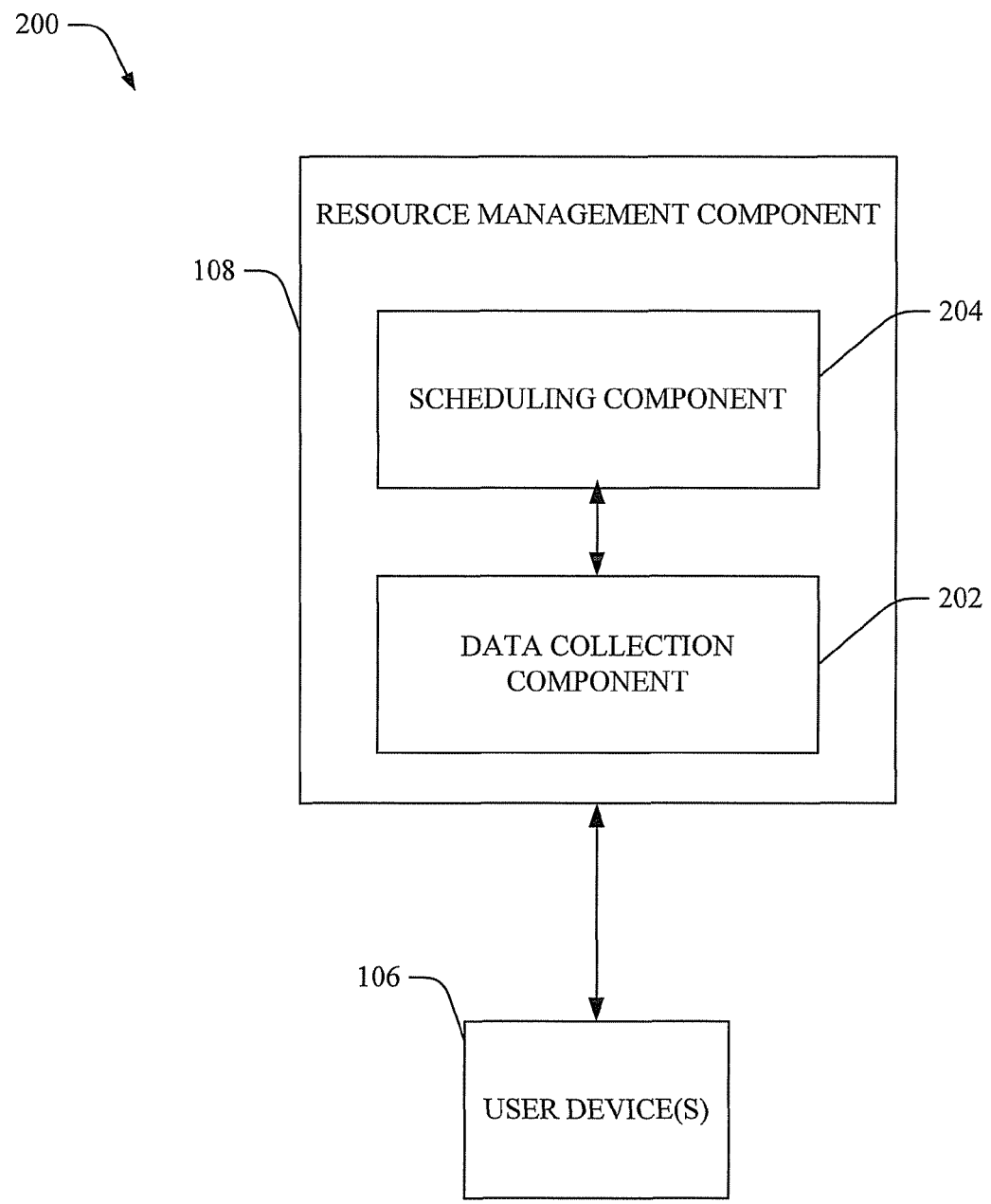
FIG. 2 illustrates a non-limiting embodiment of an example system configured to facilitate management of cloud computing resources.

FIG. 2 illustrates a non-limiting embodiment of an example system 200 that is configured to facilitate management of cloud computing resources. As the popularity of cloud computing continues to grow, the importance of efficiently managing cloud resources is increased. Moreover, resource management component 108 controls scheduling and/or allocation of resources, in a manner such that, performance is increased and/or operating costs are decreased. It is further noted that one or more user devices 106 and resource management component 108 can include functionality, as more fully described herein, for example, with regard to system 100.

In one aspect, resource management component 108 can include a data collection component 202 and a scheduling component 204. Data collection component 202 can request calendar data from a set of user devices 106. As an example, calendar data (e.g., related to a future time or date) can include, but is not limited to, schedule-related information, meeting information, tasks, to-do lists, event data, appointment data, project timeline or deadline information, work shift data, project assignment data, workflow data, availability data, etc. According to an embodiment, data collection component 202 can request calendar data, for example, periodically, on demand, at a specific time, based on an event/schedule, etc. Additionally or alternatively, one or more user devices 106 can push the calendar data to data collection component 202, for example as a user enters the information, periodically, at a specific time, during an idle mode, etc. In other words, data collection component 202 can provide a link or interface between a cloud computing system and a calendar(s) associated with a user of a user device, such as user device(s) 106. As an example, calendar data can be received from a system or user application associated with one or more user devices 106 and/or a web-based portal associated with user(s).

Scheduling component 204 can analyze the calendar data to determine, in advance, a workload at a specific time and/or during a specific time range. Moreover, the workload can be indicative of a number of requests received from one or more user devices 106 and/or a number of requests being processed by the cloud computing system at the specific time and/or during the specific time range. As an example, calendar data can be indicative of timing data, for example, a time (or range) at which a request can be sent by one or more user devices 106 and/or received by the cloud computing system. In one aspect, scheduling component 204 can divide resources within the cloud computing system into at least two parts. For example, Part I can include resources (e.g., servers) that can respond relatively slowly but operate with a low cost, and Part II can include resources (e.g., servers) that can respond immediately (or almost immediately) but operate with a high cost. In one aspect, scheduling component 204 can allocate Part I for servicing planned requests, received from one or more user devices 106, and can allocate Part II for servicing random requests, for example, requests that are received from users that access cloud resources stochastically. Further, scheduling component 204 can implement power management techniques to decrease power consumption of one or more resources within Part I, based on calendar data.

As an example, data collection component 202 can obtain calendar data from an employee's calendar on a work laptop, indicating two days of vacation time. Based on an evaluation of calendar data, scheduling component 204 can determine a low probability (e.g., below a predefined threshold) of receiving a request from the employee during the two vacation days. Accordingly, scheduling component 204 can shut down at least a portion of resources within Part I to conserve power and/or reduce costs.

Figure 3:
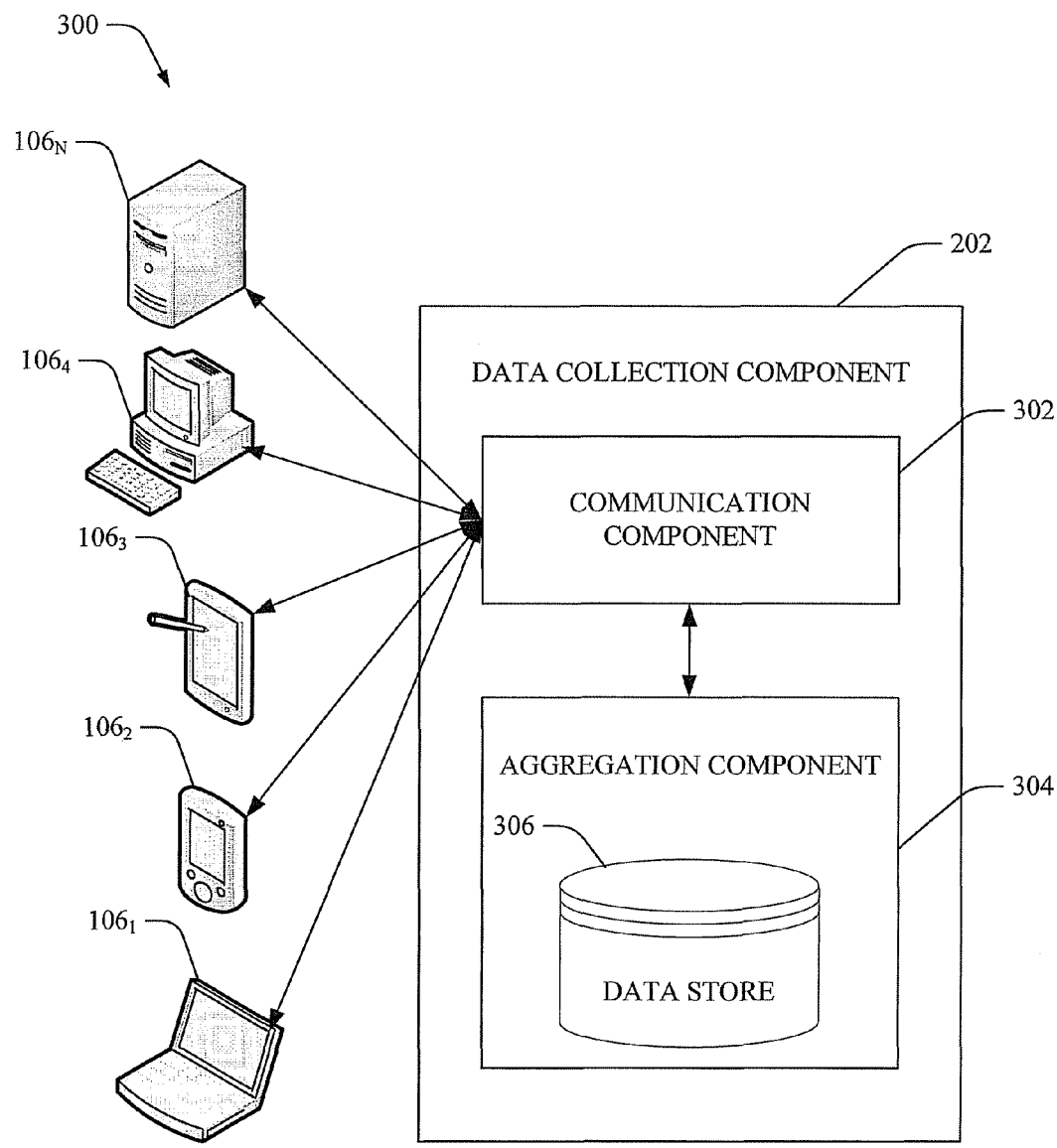
FIG. 3 illustrates a non-limiting embodiment of an example system configured to obtain calendar data that is utilized for workload scheduling.

FIG. 3 illustrates a non-limiting embodiment of an example system 300 configured to obtain calendar data that is utilized for workload scheduling. As depicted, system 300 includes data collection component 202, which further includes a communication component 302 and an aggregation component 304 that can facilitate data collection and data aggregation, respectively. Moreover, data collection component 202 can include functionality, as more fully described herein, for example, with regard to system 200.

According to an aspect, communication component 302 can provide an interface to communicate with and collect calendar data from one or more user devices ($106_1$-$106_N$; wherein N can be any natural number). By way of example, one or more user devices $106_1$-$106_N$ can include, but are not limited to, a personal computer, a tablet computer, a cellular phone, a personal digital assistant (PDA), a laptop, a gaming module, a media player/recorder, a digital diary, a digital calendar/clock, and the like. In addition, one or more user devices $106_1$-$106_N$ can also include a server (e.g., web server and/or network server), data store, data center, and the like, for example, that stores schedule-related data associated with one or more users, an office, a factory, a business, an organization etc. In one example, one or more user devices $106_1$-$106_N$ can be associated with a single user and/or multiple users. As an example, communication component 302 can employ various wired and/or wireless networks and/or protocols for communication with user devices $106_1$-$106_N$, including, but not limited to, cellular networks, WiFi networks, Internet Protocol (IP) networks, etc.

In one embodiment, communication component 302 can query and/or poll a set of user devices $106_1$-$106_N$, for example, periodically (e.g., daily, weekly, biweekly, etc.), at a specific time (e.g., at midnight), based on a predefined schedule, on demand, in response to an event, during an idle mode and/or low traffic conditions, etc. In another embodiment, one or more user devices $106_1$-$106_N$ can transmit relevant calendar data to the communication component, for example, in response to a user generating or editing the calendar data, periodically (e.g., daily, weekly, biweekly, etc.), during an idle mode, at a specific time, date, or schedule, on demand, in response to an event, etc. Typically, calendar data can include, but is not limited to, data associated with events, appointments, meetings, tasks, work shifts, work flows, project timelines, to-do lists, journal entries, due dates or deadlines, free/busy times, etc. Further, in one embodiment, communication component 302 can receive explicit user input (e.g., via user devices $106_1$-$106_N$) specifying when and how the user plans to utilize cloud resources. In one aspect, communication component 302 can receive and/or request calendar data based on one or more privacy policies associated with users. For example, data associated with events or appointments marked as private, will not be collected by data collection component 202.

According to an aspect, aggregation component 304 can aggregate and store calendar data obtained by communication component 302, in a data store 306. Moreover, calendar data can be utilized to improve scheduling of workloads associated with resources in the cloud computing system. As an example, workload scheduling can be substantially improved by utilization of calendar data, even for cases in which calendar data does not have a high level of accuracy. It is noted that data store 306 can include volatile memory(s) or nonvolatile memory(s), or can include both volatile and nonvolatile memory(s). By way of illustration, and not limitation, nonvolatile memory can include read only memory (ROM), programmable ROM (PROM), erasable programmable ROM (EPROM), electrically erasable PROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRDRAM). The memory (e.g., data stores, databases) of the subject systems and methods is intended to include, without being limited to, these and any other suitable types of memory.

Figure 4:
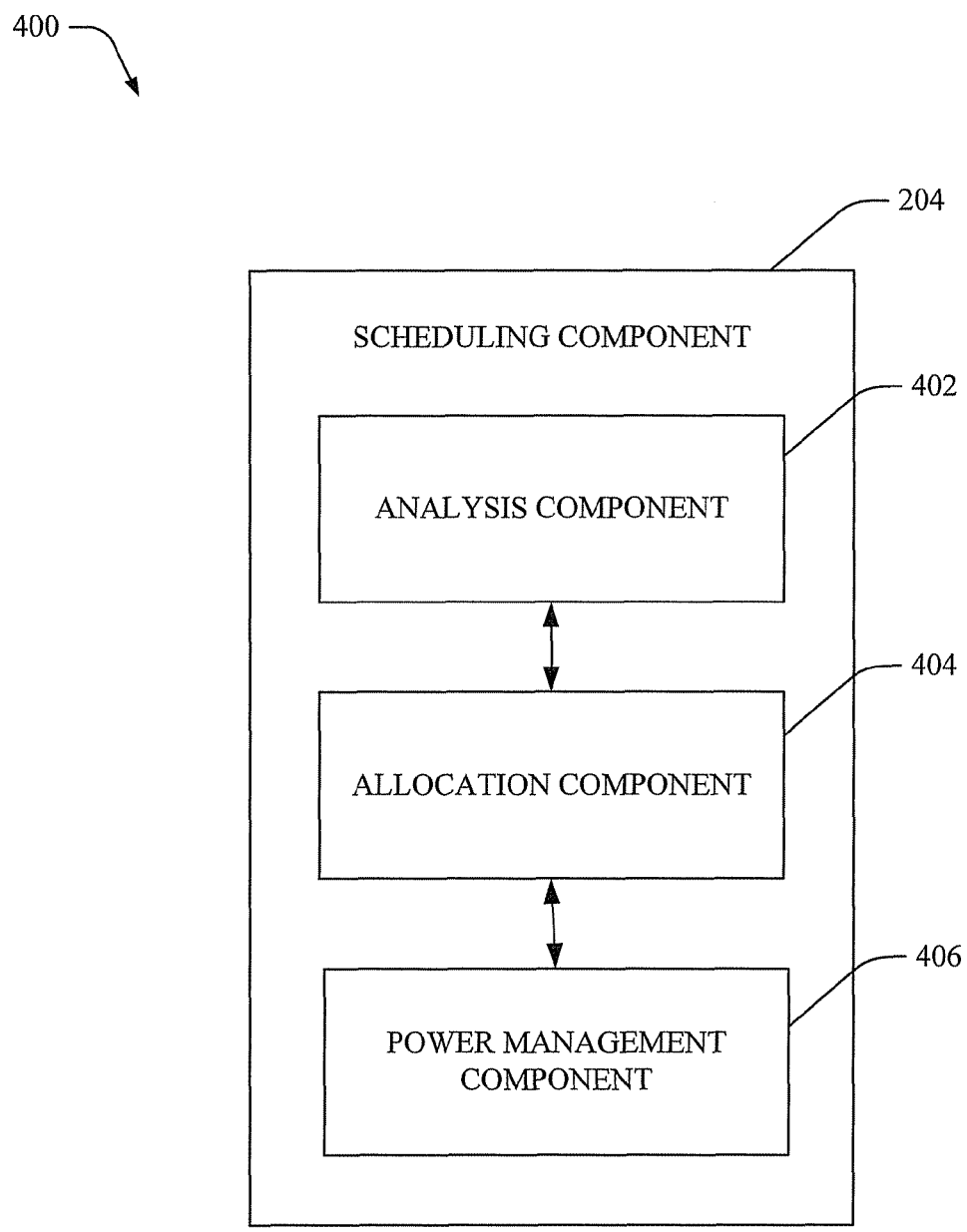
FIG. 4 illustrates a non-limiting embodiment of an example system configured to dynamically schedule cloud resources based on calendar data.

FIG. 4 illustrates a non-limiting embodiment of an example system 400, configured to dynamically schedule cloud resources based on calendar data. In one aspect, scheduling component 204 can include an analysis component 402, an allocation component 404, and a power management component 406. Moreover, scheduling component 204 can include functionality, as more fully described herein, for example, with regard to system 200.

In one aspect, analysis component 402 can evaluate calendar data (e.g., collected and stored by data collection component 202) received from one or more user devices. Moreover, analysis component 402 can predict timing data indicative of an arrival time (or time range) associated with receipt of request(s), for a cloud service(s), sent by one or more user devices. Such request(s) can be referred to as a planned or a predictable request(s) (e.g., since an arrival time associated with receipt of the request(s) can be planned and/or predicted based on calendar data). It is noted that request(s) can be received from user device(s) that provides the calendar data (e.g., user devices 106) and/or from a different device(s) associated with the user(s). For example, although calendar data can be obtained from a user's cell phone, a planned/predictable request for a cloud service can be received at the cloud computing infrastructure from the user's laptop. Further, analysis component 402 can identify, predict, and/or infer a type of request that will be received, for example, a specific service that is likely to be requested, based on evaluation of the calendar data. Furthermore, analysis component 402 can determine an estimated and/or predicted system workload during a period of time, based on the timing data.

The estimated and/or predicted system workload can be utilized by allocation component 404 to facilitate dynamic allocation of cloud resources. In one aspect, allocation component 404 can partition the total number of available cloud resources into at least two parts (e.g., equal or unequal). For example, a first part can include a first set of servers that can be utilized to service predictable requests (e.g., requests that are predicted based in part on calendar data), and a second part can include a second set of servers that can be utilized to service unplanned requests (e.g., requests from users that access the cloud stochastically). In other words, the first part can be utilized by customers that provide calendar data to the cloud computing infrastructure and the second part can be utilized for the customers that do not provide calendar data to the cloud computing infrastructure. It is noted that allocation component 404 is not limited to portioning the cloud resources into two parts and that cloud resources can be divided into most any number of parts (e.g., based on an amount or accuracy of data provided by the customer, desired response times, service charges, etc.). For example, a third part can include a third set of servers that can be utilized to service planned requests, for example, requests that are explicitly specified by a user in advance.

According to an aspect, power management component 406 can control a power mode associated with one or more portions of the cloud computing resources (e.g., the first set of servers) to reduce power consumption and costs. As an example, power management component 406 can shut down (or switch to a low-power/sleep/stand by power mode) the first set of servers on identifying, based on timing data, that a planned request is not likely to be received and/or processed. Accordingly, power consumption and costs can be reduced during time period that one or more user devices are not utilizing or accessing cloud resources.

In one example, allocation of servers between the first and second parts (e.g., by allocation component 404) is based on accuracy of timing data and on user/application preferences relating to response time. Further, allocation of servers between the first and second parts can be adjusted dynamically. In one aspect, if request plans of all users are known in advance, power management component 406 can shut down the first set of servers when the users do not utilize/access cloud services and power-up the first set of servers before (or in response to/subsequent to) receiving the planned requests. In another aspect, if all the request plans are not known in advance, power management component 406 can ensure that the first set of servers are in a ready state (e.g., powered on) for servicing requests received at any time. Moreover, if the user/application has a higher delay tolerance and can bear a preparation time delay (e.g., start-up delay), power management component 406 can power up the first set of servers on (or after) receiving the planned request.

Figure 5:
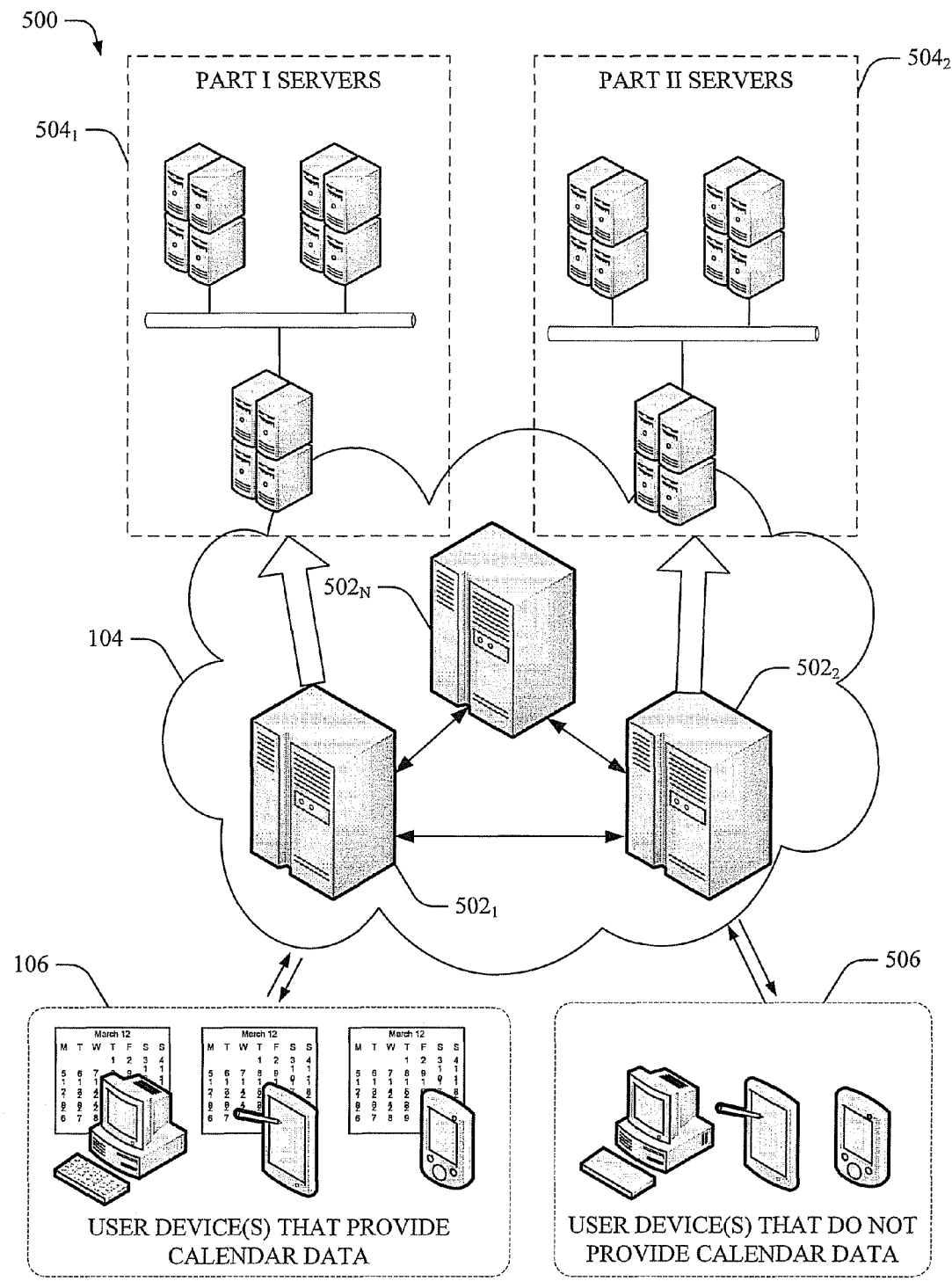
FIG. 5 is a high level diagram of a non-limiting embodiment of an example system that is configured to service planned and/or unplanned requests.

FIG. 5 is a high level diagram of a non-limiting embodiment of an example system 500 that is configured to service planned and/or unplanned requests. In one aspect, cloud computing infrastructure 104 and/or user device(s) 106 can include functionality, as more fully described herein, for example, with regard to systems 100-400. As an example, cloud computing infrastructure 104 can receive and/or collect calendar data from one or more user devices 106 and determine a workload for future time period(s) (e.g., by utilizing resource management component 108). Moreover, cloud resources ($502_1$-$502_N$) can be dynamically partitioned based on the determined workload during a specific time period. As an example, cloud resources ($502_1$-$502_N$) can be divided into Part I servers $504_1$ and Part II servers $504_2$ (e.g., by allocation component 404). According to an aspect, Part I servers $504_1$ can service requests (e.g., planned requests) received from one or more user devices 106, for example, devices associated with subscribers that provide calendar data, and Part II servers $504_2$ can service requests (e.g., unplanned requests) received from one or more user devices 506, for example, devices associated with subscribers that do not provide calendar data. As an example, the servicing can include, but is not limited to, analyzing and/or processing data associated with the received request to generate a response. The response can be transmitted back to the requestor (e.g., user devices 106 and/or 506) and/or utilized for further processing.

According to an embodiment, Part I servers $504_1$ can be switched (e.g., by power management component 406) to a power mode that reduces power consumption, for example, but not limited to, a shut down mode, a low power mode, a sleep mode, etc., during a time period that planned requests are not likely to be received by the cloud computing infrastructure 104. As an example, Part II servers $504_2$ can be in an always-ready and/or full power mode, to service unplanned requests. In one aspect, if Part II servers $504_2$ cannot handle all unplanned requests received from one or more user devices 506, power mode of at least a portion of Part I servers $504_1$ can be switched to a full-power or power-on mode, and the portion of Part I servers $504_1$ can be utilized to service a set of unplanned requests. Typically, a preparation time delay is introduced during switching Part I servers $504_1$ from a low power state (e.g., shut down) to a ready state (e.g., power on). In one aspect, since power consumption of Part I servers $504_1$ can be reduced, requests serviced by Part I servers $504_1$ can be charged a lower fee and/or assigned a lower billing rate than requests serviced by Part II servers $504_2$.

As an example, consider a non-limiting scenario in which an engineer utilizes cloud resources ($502_1$-$502_N$) to run an algorithm for two hours daily, with a varying starting time. In one aspect, cloud computing infrastructure 104 (e.g., by utilizing resource management component 108) can determine and/or predict which two hours the engineer uses to run the algorithm for a given day, and can shut down Part I servers $504_1$ for the remaining time. Accordingly, by providing calendar data that includes explicit and/or implicit data relating to timing of planned requests, workload can be calculated in advance and thus, efficient scheduling can be facilitated.

Figure 6:
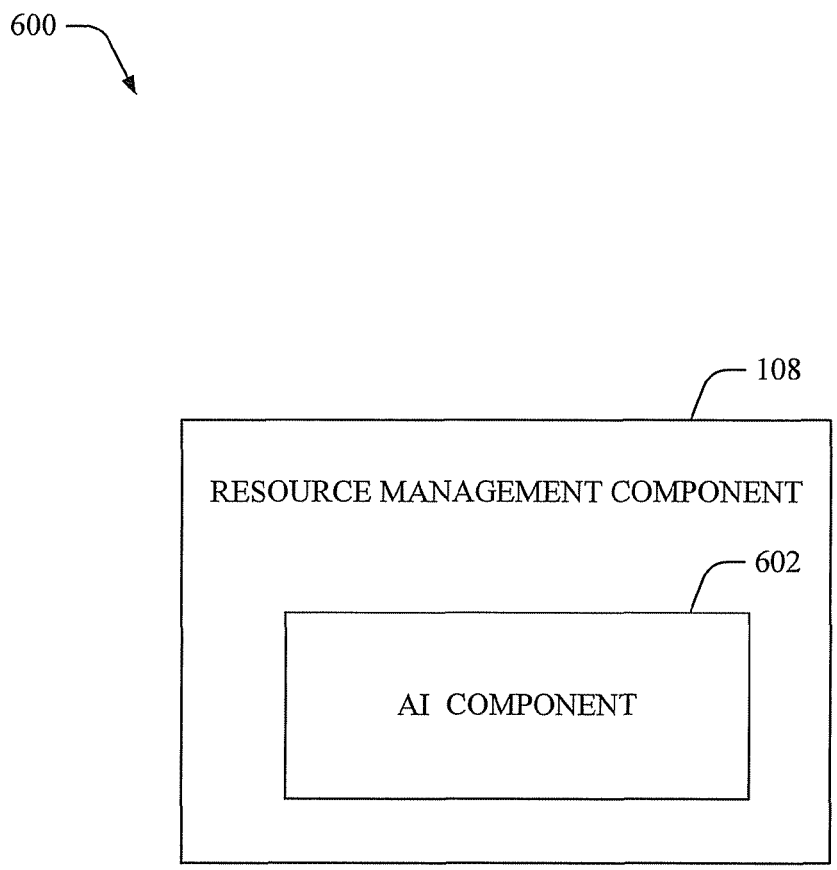
FIG. 6 illustrates an example system that facilitates automating one or more features in accordance with at least some aspects of the subject disclosure.

FIG. 6 illustrates a system 600 that facilitates automating one or more features in accordance with at least some aspects of the subject disclosure. In one embodiment, system 600 can include an artificial intelligence (AI) component 602, for example, that resides within resource management component 108, as shown in FIG. 6, and/or can be locally or remotely connected to resource management component 108. The subject disclosure (e.g., in connection with workload scheduling) can employ various AI-based schemes for carrying out various aspects thereof. For example, a process for determining and/or verifying the timing data and/or workload, allocation of resources, power management of resources, etc. can be facilitated via an automatic classifier system and process.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. In the case of cloud computing services, for example, attributes can be derived from calendar data, and the classes can be categories or areas of interest (e.g., levels of priorities). A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, various embodiments can employ classifiers that are explicitly trained (e.g., via a generic training data) as well as implicitly trained (e.g., via observing user behavior, receiving extrinsic information). For example, SVMs are configured via a learning or training phase within a classifier constructor and feature selection module. Thus, classifier(s) can be used to automatically learn and perform a number of functions, including but not limited to determining according to a predetermined criteria when a request is likely to be received by a cloud computing infrastructure, how cloud resources can be partitioned to facilitate optimal and/or efficient scheduling, when a power mode(s) associated with a set of cloud resources is to be switched, etc. The criteria can include, but is not limited to, historical patterns, user device behavior, user preferences, cloud computing service provider preferences and/or policies, resource availability and/or capacity/capability, etc.

Figure 7:
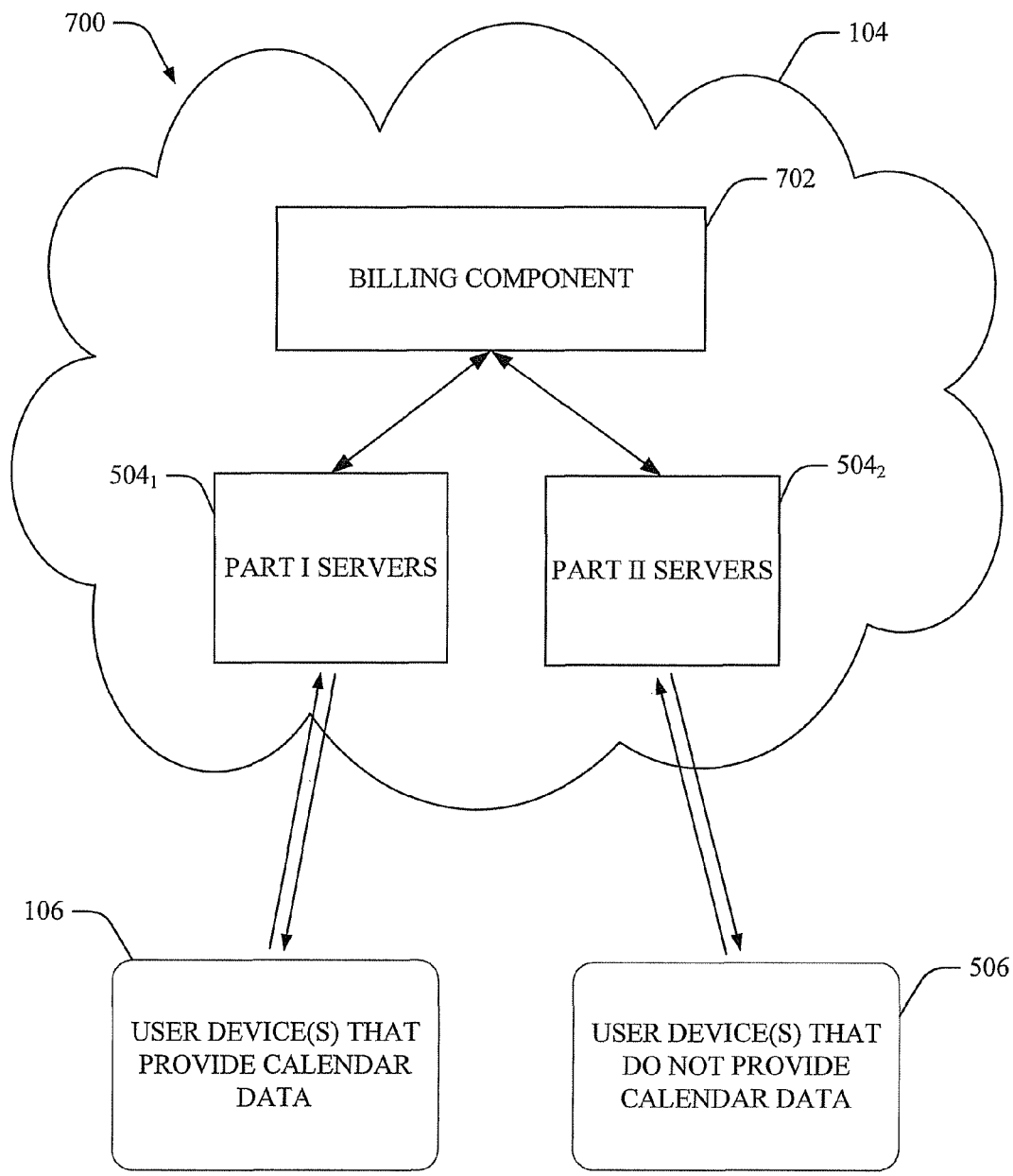
FIG. 7 illustrates a block diagram of a non-limiting embodiment of an example system configured to facilitate billing associated with a cloud computing infrastructure.

FIG. 7 illustrates a block diagram of a non-limiting embodiment of an example system 700 configured to facilitate billing associated with a cloud computing infrastructure. In one example, cloud computing infrastructure 104, user device(s) 106, Part I servers $504_1$, Part II servers $504_2$, and user device(s) 506 can include functionality, as more fully described herein, for example, with regard to systems 100-500. According to an aspect, cloud computing infrastructure 104 can include (or be communicatively coupled to) a billing component 702, which can be employed to generate and/or retain billing records associated with resource utilization. Moreover, billing component 702 can monitor the planned and unplanned requests received from user device(s) 106 and user device(s) 506, respectively. Additionally or alternatively, billing component 702 can track usage of Part I servers and/or Part II servers for servicing requests.

Typically, billing component 702 can utilize one or more billing policies and/or schemes defined by a cloud computing service provider to generate/update billing records. For example, billing component 702 can assign a lower fee and/or billing rate for planned requests, received from user device(s) 106, as compared to a fee and/or billing rate assigned to unplanned requests, received from user device(s) 506. Additionally or alternatively, billing component 702 can charge a fee/billing rate based on resource utilization, for example, billing component 702 can charge a lower fee for utilization of Part I servers $504_1$, as compared to utilization of Part II servers $504_2$. Further, billing component 702 can prepare, for example, monthly, annually, etc., a bill or invoice for a user, which can be transmitted to a user device and/or accessed via an online portal.

Figure 8:
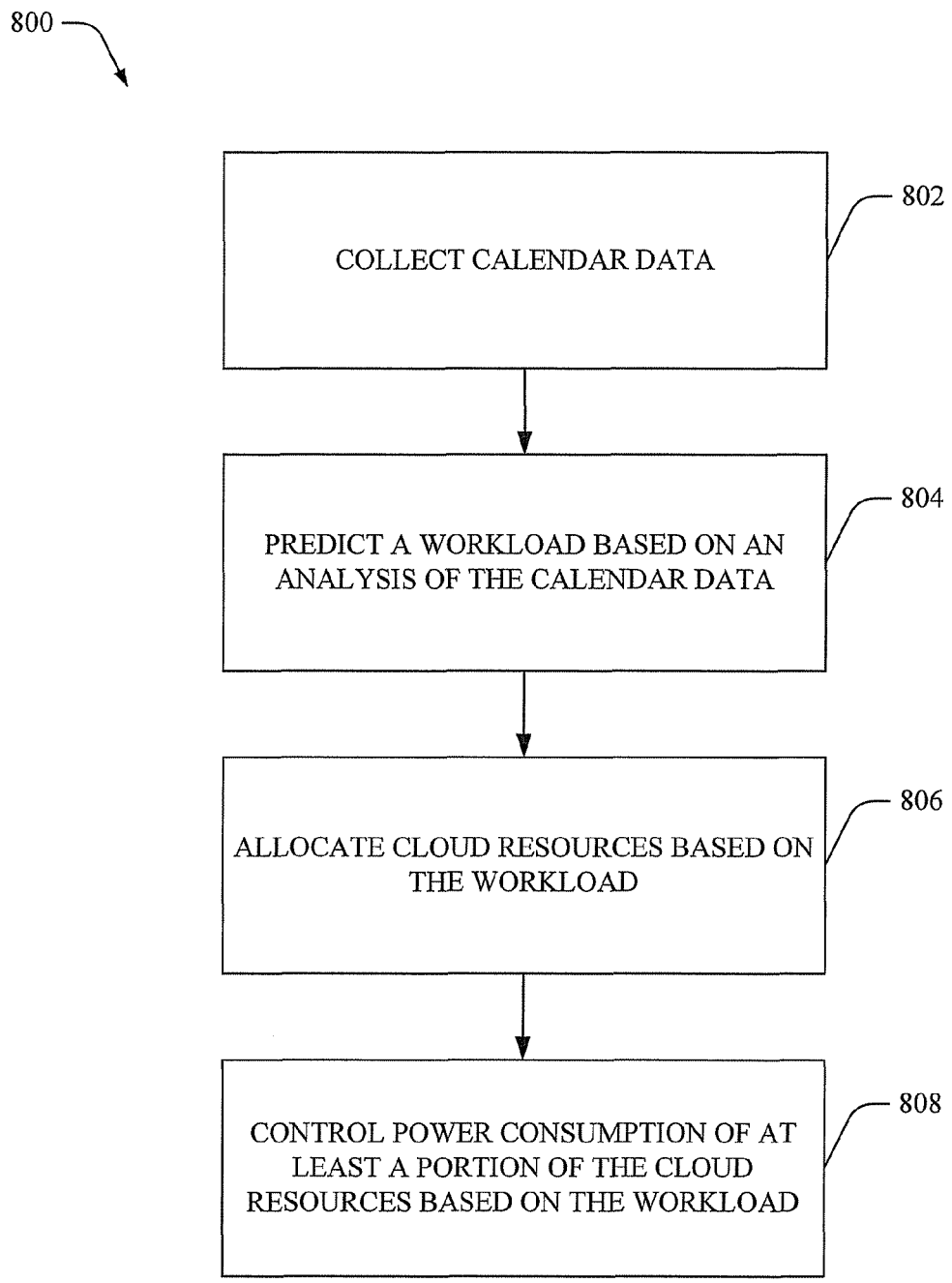
FIG. 8 illustrates a non-limiting embodiment of an example method that facilitates workload prediction based on calendar data.
Figure 9:
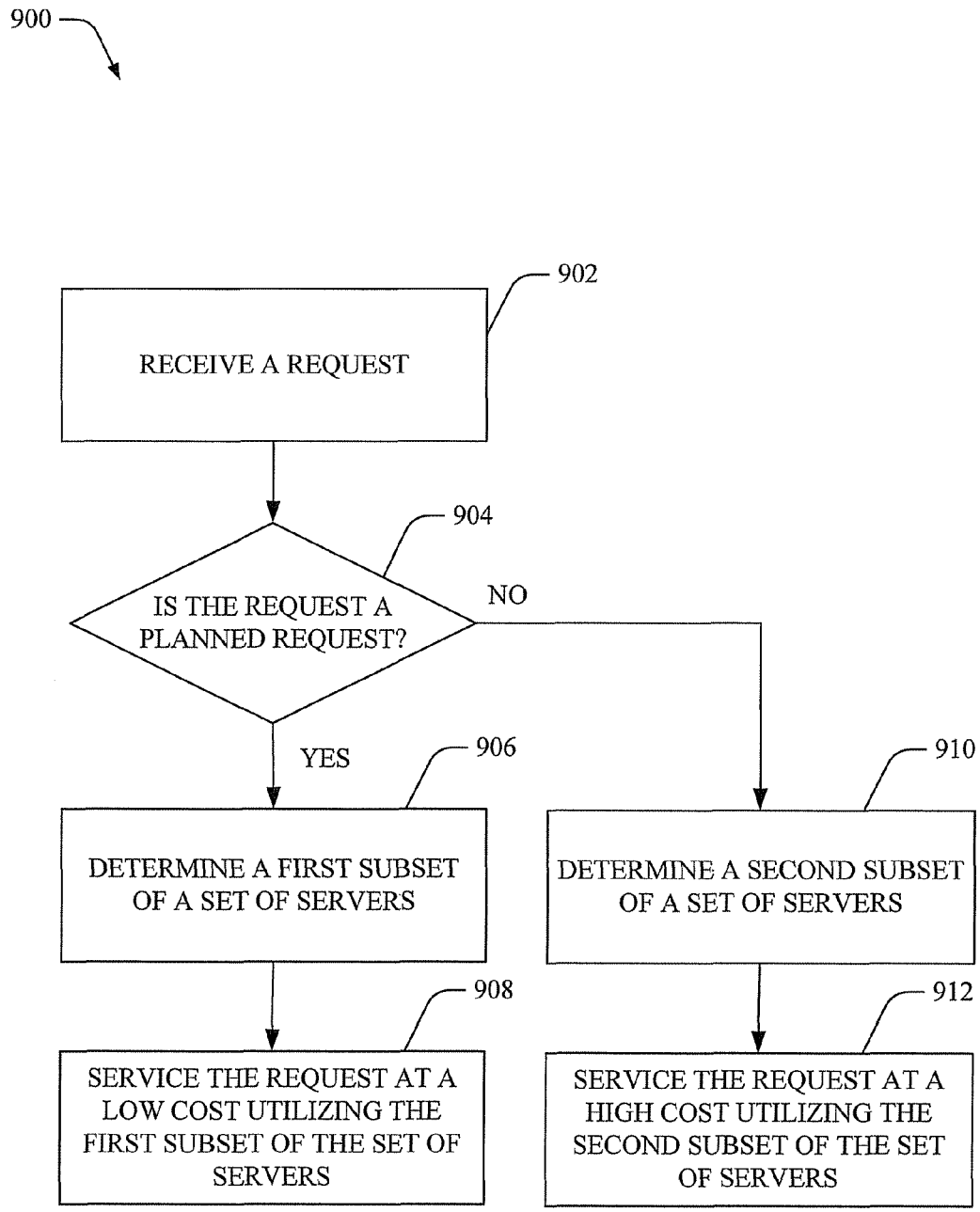
FIG. 9 illustrates a non-limiting embodiment of an example method that facilitates efficient workload balancing and request servicing.
Figure 10:
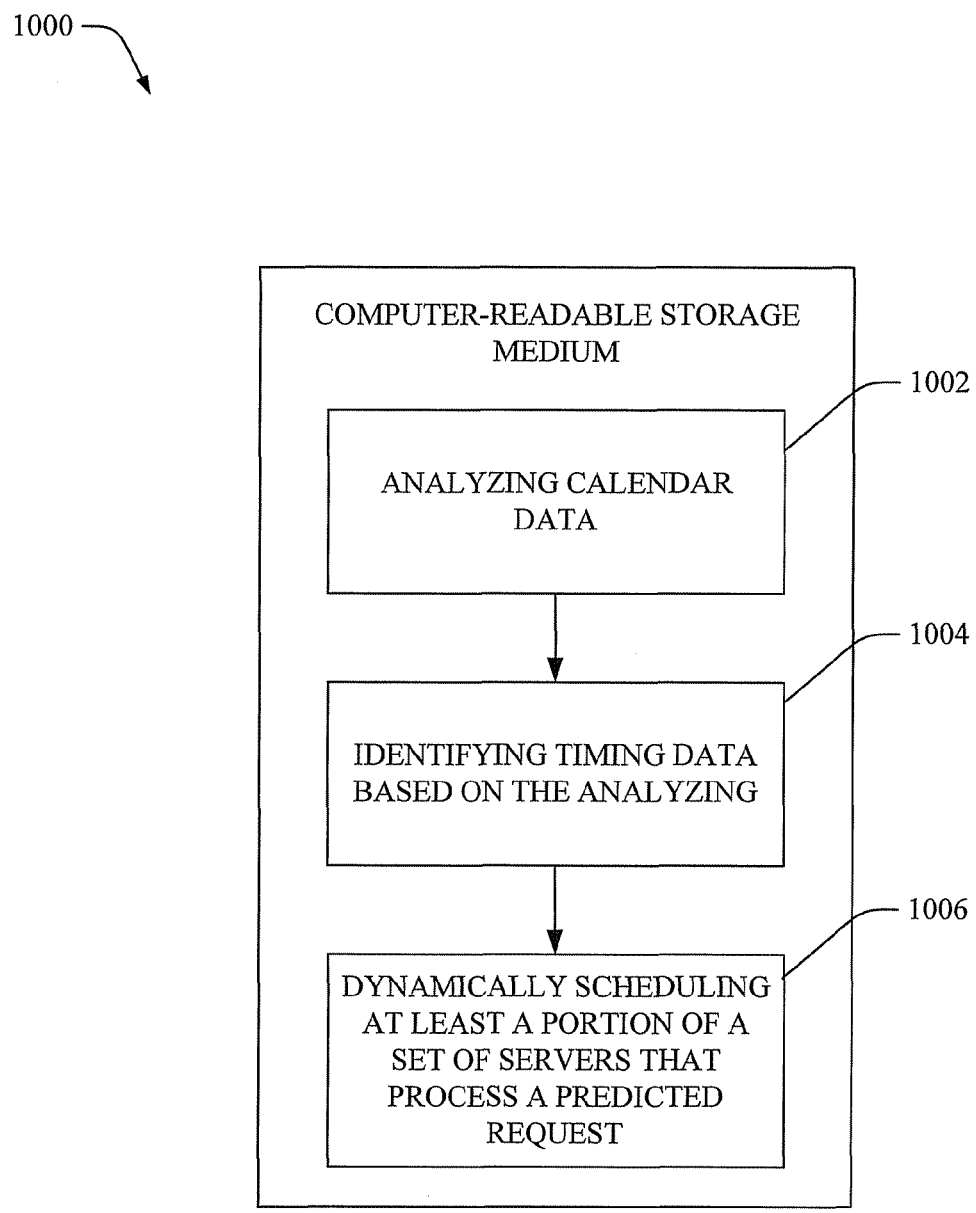
FIG. 10 illustrates a non-limiting embodiment of a set of computer-readable instructions for scheduling a set of servers based on calendar data.

FIGS. 8-10 illustrate methods and/or flow diagrams in accordance with the disclosed subject matter. For simplicity of explanation, the methods are depicted and described as a series of acts. It is to be understood that the various embodiments are not limited by the acts illustrated and/or by the order of acts, for example acts can occur in various orders and/or concurrently, and with other acts not presented and described herein. Furthermore, not all illustrated acts may be required to implement the methods in accordance with the disclosed subject matter. In addition, it is noted that the methods could alternatively be represented as a series of interrelated states via a state diagram or events. Additionally, it is further noted that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or computer-readable storage/communications media.

Referring now to FIG. 8, there illustrated is a non-limiting embodiment of an example method 800 that facilitates workload prediction based on calendar data. Example methods may include one or more operations, functions or actions as illustrated by one or more of blocks 802, 804, 806, and/or 808.

An example process for predicting workload based on calendar data may begin with block 802. At block 802, calendar data can be collected, for example, from one or more communication devices associated with a subscriber (e.g., an individual user or an enterprise). As an example, calendar data can be requested and/or received periodically, in response to an event, during idle mode or low network traffic, at a specified schedule, on demand, etc. Further, calendar data can include, but is not limited to, data associated with events, appointments, meetings, tasks, work shifts, to-do lists, assignments, free/busy times, etc. Block 802 may be followed by block 804.

At block 804, a workload can be predicted based on an analysis of calendar data. In one aspect, timing data related to arrival and/or receipt of a planned/predictable request can be determined. Further, a type of the planned/predictable request and/or resource(s) utilized for servicing the planned/predictable request can also be identified. Block 804 may be followed by block 806. At block 806, cloud resources can be allocated based on the workload. As an example, cloud resources can be divided into at least two parts, such that a first part can include resources (e.g., servers) that respond relatively slowly (e.g., due to a start-up delay) but operate with a low cost, and a second part can include resources (e.g., servers) that can respond immediately (or almost immediately) but operate with a high cost. The first part can be utilized for processing planned/predictable requests, while the second part can be utilized for processing unplanned/unpredictable requests. Further, at block 808, power consumption of at least a portion of cloud resources can be controlled based on the workload. For example, servers in the first part can be shut down, if determined that a planned request will not be received for a predefined amount of time.

FIG. 9 illustrates a non-limiting embodiment of an example method 900 that facilitates efficient workload balancing and request servicing. In one aspect, method 900 can facilitate scheduling cloud resources by identifying a workload associated with planned requests, based in part on calendar data received from a set of subscriber devices. Example methods may include one or more operations, functions or actions as illustrated by one or more of blocks 902, 904, 906, 908, 910, and/or 912.

An example process for efficient workload balancing can begin with block 902. At block 902, a request can be received, for example, from a subscriber device. Block 902 may be followed by decision block 904. At decision block 904, it can be determined whether the request is a planned request. For example, it can be identified whether the request is received from a device associated with a subscriber that has provided and/or shared at least a portion of his/her calendar data. If determined that the request is a planned request, then at block 906, a first subset of the set of servers can be determined. As an example, the first subset can include servers that are allocated for servicing one or more planned requests and that conserve power (e.g., are switched to a low power-mode when the planned request is not likely to be received). Block 906 may be followed by block 908. At block 908, the request can be serviced at a low cost by utilizing the first subset of the set of servers. Alternatively, if determined at decision block 904, that the request is not a planned request, then at block 910, a second subset of servers can be determined. As an example, the second subset can include servers that are employed to service unplanned requests and are in an always-on state. Block 910 may be followed by block 912. At block 912, the request can be serviced at a high cost by utilizing the second subset of the set of servers.

FIG. 10 illustrates a flow diagram of an example, non-limiting embodiment of a set of computer-readable instructions for scheduling a set of servers based on calendar data. Computer-readable storage medium 1000 can include computer executable instructions illustrated by one or more of blocks 1002, 1004, and/or 1006. At block 1002, the instructions can operate to analyze calendar data. As an example, calendar data can be received from one or more user devices and can include, but is not limited to, event data, meeting data, busy/free data, appointment data, etc. Block 1002 may be followed by block 1004. At 1004, the instructions can operate to identify timing data based on the analyzing. As an example, timing data can be indicative of a workload at a particular time or time range. Moreover, timing data can include data associated with a predicted request that will be received from one or more user devices (e.g., receipt time, type of request, etc.).

Block 1004 may be followed by block 1006. At block 1006, the instructions can operate to dynamically schedule at least a portion of a set of servers (e.g., cloud computing servers) that process the predicted request. As an example, at least portion of the set of servers can be partitioned multiple parts, including, but not limited to, a first part that can include servers, which respond relatively slowly (e.g., due to a start-up delay) but operate with a low cost, and a second part that can include servers, which can respond immediately (or almost immediately) but operate with a high cost. Moreover, servers in the first part can be utilized for processing the predicted request. In one aspect, power consumption of servers in the first part can be controlled, for example, servers in the first part can be shut down, if determined that the predicted request will not be received for a predefined amount of time.

Example Computing Device

As noted above, one or more user device(s) 106 can be handheld, portable, and other computing devices. Accordingly, the below general purpose user device 106 described below in FIG. 11 is but one example of a computing/communication device.

Although not required, embodiments can partly be implemented via an operating system, for use by a developer of services for a device or object, and/or included within application software that operates to perform one or more functional aspects of the various embodiments described herein. Software can be described in the general context of computer executable instructions, such as program modules, being executed by one or more computers, such as client workstations, servers or other devices. It can be noted that computer systems have a variety of configurations and protocols that can be used to communicate data, and thus, no particular configuration or protocol is to be considered limiting.

Figure 11:
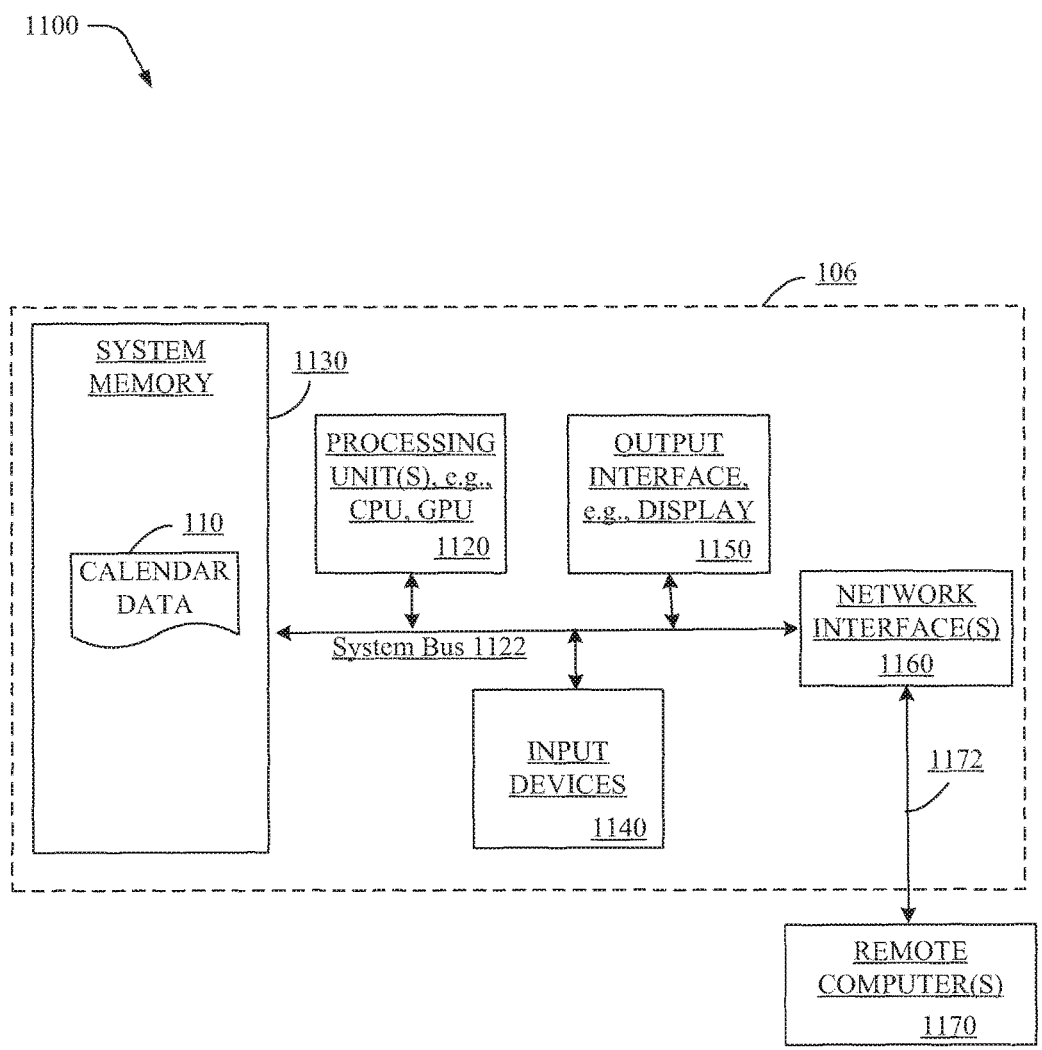
FIG. 11 is a block diagram representing an example communication device in which the various embodiments can be implemented.

FIG. 11 illustrates a block diagram 1100 of an example user device 106 in which one or aspects of the embodiments described herein can be implemented. In one example, user device 106 can include, but is not limited to, a processing unit 1120, a system memory 1130, and a system bus 1122 that couples various system components including the system memory to the processing unit 1120.

In one aspect, user device 106 can include a variety of computer readable storage media and can be any available media that can be accessed by user device 106. As an example, system memory 1130 can include computer storage media in the form of volatile and/or nonvolatile memory such as read only memory (ROM) and/or random access memory (RAM). By way of example, and not limitation, memory 1130 can also include an operating system, application programs, other program modules, and program data. In addition, memory 1130 can store calendar data 110 that can be transmitted to resource management component 108 of FIG. 1.

A user can enter commands and information (e.g., calendar data) into user device 106 through input devices 1140. A monitor, touch screen display or other type of display or display device is also connected to system bus 1122 via an interface, such as output interface 1150. In addition, user device 106 can also include other peripheral output components and/or devices such as speakers and a printer, which can be connected through output interface 1150.

In one aspect, user device 106 can operate in a networked or distributed environment using logical connections to one or more other remote computers, such as remote computer 1170. For example, remote computer 1170 can be a personal computer, a server, a router, a network PC, a peer device or other common network node, or any other remote media consumption or transmission device, and can include any or all of the elements described above relative to user device 106. The logical connections depicted in FIG. 11 include a network 1172, such local area network (LAN) or a wide area network (WAN), but can also include other communication networks/buses. Such networking environments are commonplace in homes, offices, enterprise-wide computer networks, intranets and the Internet. As an example, calendar data 110 and request(s) 112 can be transmitted to resource management component 108 of FIG. 1 via network interface 1160.

Example Computing Environment

Figure 12:
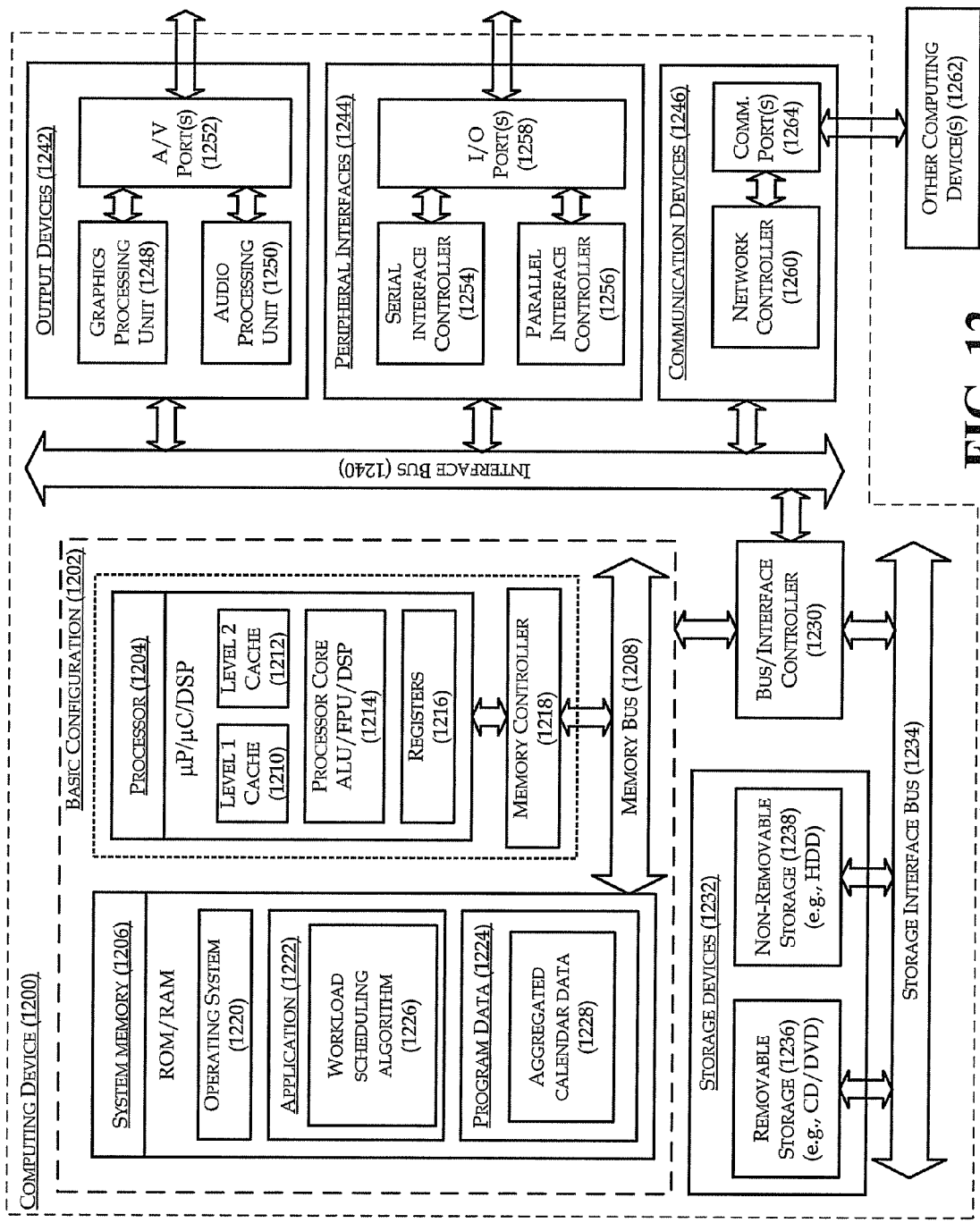
FIG. 12 is a block diagram illustrating an example computing device that is arranged for workload scheduling for network-based computing in accordance with at least some embodiments of the subject disclosure.

FIG. 12 is a block diagram illustrating an example computing device 1200 that is arranged for scheduling workload in accordance with the present disclosure. In a very basic configuration 1202, computing device 1200 typically includes one or more processors 1204 and a system memory 1206. A memory bus 1208 can be used for communicating between processor 1204 and system memory 1206.

Depending on the desired configuration, processor 1204 can be of any type including but not limited to a microprocessor (μP), a microcontroller (μC), a digital signal processor (DSP), or any combination thereof. Processor 1204 can include one more levels of caching, such as a level one cache 1210 and a level two cache 1212, a processor core 1214, and registers 1216. An example processor core 1214 can include an arithmetic logic unit (ALU), a floating point unit (FPU), a digital signal processing core (DSP Core), or any combination thereof. An example memory controller 1218 can also be used with processor 1204, or in some implementations memory controller 1218 can be an internal part of processor 1204.

Depending on the desired configuration, system memory 1206 can be of any type including but not limited to volatile memory (such as RAM), non-volatile memory (such as ROM, flash memory, etc.) or any combination thereof. System memory 1206 can include an operating system 1220, one or more applications 1222, and program data 1224. Application 1222 can include a workload scheduling algorithm 1226 that is arranged to perform the functions as described herein including those described with respect to process 800 of FIG. 8. Program data 1224 can include aggregated calendar data 1228 that can be useful for operation with the workload scheduling algorithm 1226 as is described herein. In some embodiments, application 1222 can be arranged to operate with program data 1224 on operating system 1220 such that implementations of efficient workload scheduling can be provided as described herein. This described basic configuration 1202 is illustrated in FIG. 12 by those components within the inner dashed line.

Computing device 1200 can have additional features or functionality, and additional interfaces to facilitate communications between basic configuration 1202 and any required devices and interfaces. For example, a bus/interface controller 1230 can be used to facilitate communications between basic configuration 1202 and one or more data storage devices 1232 via a storage interface bus 1234. Data storage devices 1232 can be removable storage devices 1236, non-removable storage devices 1238, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 1206, removable storage devices 1236 and non-removable storage devices 1238 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1200. Any such computer storage media can be part of computing device 1200.

Computing device 1200 can also include an interface bus 1240 for facilitating communication from various interface devices (e.g., output devices 1242, peripheral interfaces 1244, and communication devices 1246) to basic configuration 1202 via bus/interface controller 1230. Example output devices 1242 include a graphics processing unit 1248 and an audio processing unit 1250, which can be configured to communicate to various external devices such as a display or speakers via one or more A/V ports 1252. Example peripheral interfaces 1244 include a serial interface controller 1254 or a parallel interface controller 1256, which can be configured to communicate with external devices such as input devices (e.g., keyboard, mouse, pen, voice input device, touch input device, etc.) or other peripheral devices (e.g., printer, scanner, etc.) via one or more I/O ports 1258. An example communication device 1246 includes a network controller 1260, which can be arranged to facilitate communications with one or more other computing devices 1262 over a network communication link via one or more communication ports 1264.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

Computing device 1200 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1200 can also be implemented as a personal computer including both laptop computer and non-laptop computer configurations.

Figure 13:
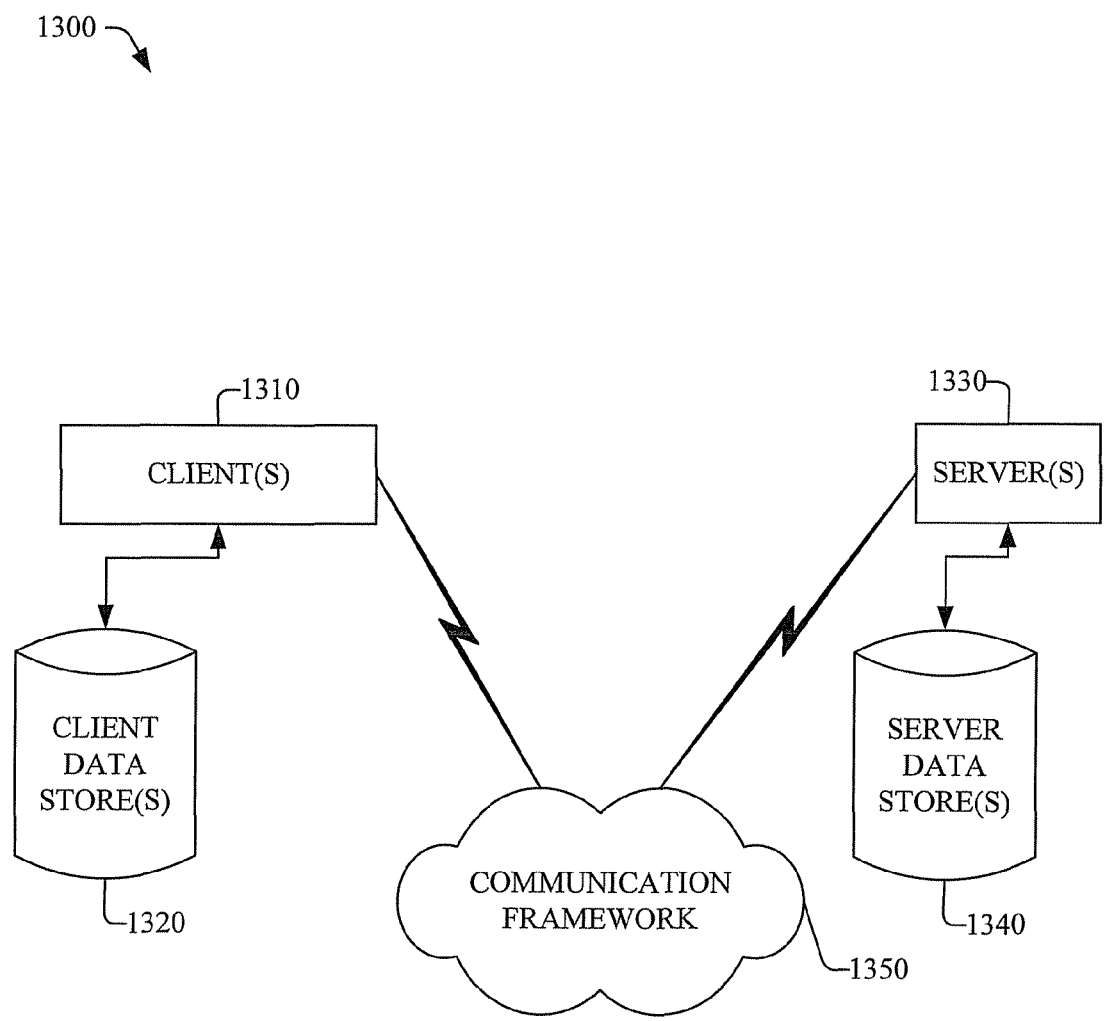
FIG. 13 is a block diagram representing an example non-limiting operating environment in which the various embodiments can be implemented.

FIG. 13 is a schematic block diagram of a sample-computing environment 1300 with which the subject matter of this disclosure can interact. The system 1300 includes one or more client(s) 1310. The client(s) 1310 can be hardware and/or software (e.g., threads, processes, computing devices). The system 1300 also includes one or more server(s) 1330. Thus, system 1300 can correspond to a two-tier client server model or a multi-tier model (e.g., client, middle tier server, data server), amongst other models. The server(s) 1330 can also be hardware and/or software (e.g., threads, processes, computing devices). The servers 1330 can house threads to perform transformations by employing this disclosure, for example. One possible communication between a client 1310 and a server 1330 can be in the form of a data packet transmitted between two or more computer processes.

The system 1300 includes a communication framework 1350 that can be employed to facilitate communications between the client(s) 1310 and the server(s) 1330. The client(s) 1310 are operatively connected to one or more client data store(s) 1320 that can be employed to store information local to the client(s) 1310. Similarly, the server(s) 1330 are operatively connected to one or more server data store(s) 1340 that can be employed to store information local to the servers 1330.

The subject disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The subject disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer can opt for a mainly hardware and/or firmware vehicle; if flexibility is paramount, the implementer can opt for a mainly software implementation; or, yet again alternatively, the implementer can opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein can be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, it is noted that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system can be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations can be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims can contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Furthermore, the terms "user," "subscriber," "customer," "consumer," and the like are employed interchangeably throughout the subject specification, unless context warrants particular distinction(s) among the terms. It is to be understood that such terms can refer to human entities or automated components supported through artificial intelligence (e.g., a capacity to make inference based on complex mathematical formalisms), which can provide simulated vision, sound recognition and so forth. As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the subject disclosure have been described herein for purposes of illustration, and that various modifications can be made without departing from the scope and spirit of the subject disclosure. Accordingly, the various embodiments disclosed herein are not intended to be limiting, with the true scope and spirit being indicated by the following claims.

What is claimed is:

1. A method, comprising:
receiving, by a system comprising a processor, first calendar data transmitted from respective first sets of devices, wherein the first calendar data comprises respective first meeting data associated with first sets of subscribers of the first sets of devices;
prior to receiving a first set of requests from the first sets of devices, determining a workload to be performed at a specific time or range of time based in part on an analysis of the first calendar data; and
based on the workload and start-up delay data associated with servers, allocating a first set of the servers to respond to the first set of requests and a second set of the servers to respond to a second set of requests received from respective second sets of devices that do not share second calendar data with the system, wherein the second calendar data comprises respective second meeting data associated with a second set of subscribers of the second set of devices and wherein the first set of the servers have a first start-up delay that is greater than a second start-up delay of the second set of the servers.

2. The method of claim 1, further comprising:
facilitating load balancing of the first set of the servers in accordance with the workload.

3. The method of claim 1, wherein the determining comprises determining, based on the analysis, timing data associated with a request of the first set of requests that is to be received from a device of the first sets of devices.

4. The method of claim 1, wherein the receiving comprises receiving the first calendar data associated with an enterprise related to the first sets of devices.

5. The method of claim 1, further comprising: determining that a request of the first set of requests has been received; and directing the request to the first set of the servers to facilitate servicing of the request.

6. The method of claim 1, wherein the allocating comprises allocating the second set of the servers to service a request of the second set of requests in response to determining that a time of receipt of the request cannot be determined based on the analysis.

7. The method of claim 6, further comprising: determining that the request has been received; and
directing the request to the second set of the servers to facilitate servicing of the request.

8. The method of claim 3, wherein the allocating further comprises allocating the first set of the servers and the second set of the servers based on preference data related to a preference associated with an application of a device of the first sets of devices.

9. The method of claim 3, further comprising:
facilitating power management associated with the first set of the servers.

10. The method of claim 9, wherein the facilitating comprises switching at least a portion of the first set of servers to at least one of a shut-down mode or a low-power mode, during a time period at which the request is not likely to be received.

11. The method of claim 9, wherein the facilitating comprises switching on at least a portion of the first set of the servers during a time period at which the request is likely to be received.

12. The method of claim 1, further comprising:
assigning a first billing rate for servicing a first request of the first set of requests; and
assigning a second billing rate, that is higher than the first billing rate, for servicing a second request of the second set of requests.

13. The method of claim 1, wherein the allocating further comprises allocating the first set of the servers and the second set of the servers based on accuracy data related to an accuracy of timing data indicative of the specific time or the range of time.

14. A system, comprising:
a memory; and
at least one processor, communicatively coupled to the memory, that facilitates execution of one or more computer-executable components, comprising:
a data collection component configured to receive first calendar data transmitted by a first set of devices, wherein the first calendar data comprises first appointment data associated with a first subscriber; and
a resource management component configured to schedule, based in part on the first calendar data and prior to receiving a first request from a first device of the first set of devices, a first portion of a set of servers to facilitate provision of service for the first request and schedule a second portion of the set of servers to facilitate provision of service for a second request from a second device of a second set of devices associated with a second subscriber that does not share second calendar data with the data collection component, wherein the second calendar data comprises second appointment data associated with the second subscriber and wherein the second portion of the set of servers start-up faster than the first portion of the set of servers.

15. The system of claim 14, wherein the computer-executable components further comprise:
a scheduling component configured to facilitate load balancing the first calendar data.

16. The system of claim 14, wherein the first calendar data further comprises at least one of work shift data or work flow data associated with the first subscriber.

17. The system of claim 16, wherein the analysis component is further configured to determine a time period associated with receipt of the first request based on the first calendar data.

18. The system of claim 17, wherein the resource management component is further configured to facilitate power management of at least the first portion of the set of servers based on the time period.

19. The system of claim 14, wherein the computer-executable components further comprise:
a billing component configured to charge a first billing rate applicable to provision of the service for the first request and a second billing rate applicable to provision of the service for the second request, wherein the first billing rate is lower than the second billing rate.

20. The system of claim 14, wherein the first calendar data comprises indication data related to an indication received from a first device of the first set of devices associated with a timing of the first request.

21. A non-transitory computer-readable storage medium having stored thereon computer-executable instructions that, in response to execution, cause a computing system comprising a processor to perform operations, comprising:
analyzing first calendar data that has been transmitted from respective first sets of devices, wherein the first calendar data represents respective first appointments associated with first sets of subscribers;
based on the analyzing, determining timing data associated with a set of predicted requests received from the respective first sets of devices; and
scheduling, based on the timing data and prior to receiving the predicted requests, a first portion of a set of servers that process the set of predicted requests and a second portion of the set of servers that process a set of unpredicted requests received from respective second sets of devices associated with respective second sets of subscribers that do not share second calendar data with the computing system, wherein the second calendar data represents respective second appointments associated with the second set of subscribers and wherein the second portion of the set of servers are determined to perform a start-up operation faster than the first portion of the set of servers.

22. The non-transitory computer-readable storage medium of claim 21, wherein the operations further comprise:
allocating at least the first portion of the set of servers to process the set of predicted requests; and
allocating the second portion of the set of servers to process the set of unpredicted requests.

23. The non-transitory computer-readable storage medium of claim 21, wherein the operations further comprise:
assigning a first billing rate applicable to processing the set of predicted requests and a second billing rate applicable to processing the set of unpredicted requests, wherein the first billing rate is lower than the second billing rate.

24. The non-transitory computer-readable storage medium of claim 21, wherein the scheduling comprises facilitating a modification of a power mode of one or more servers of the set of servers based on the determining.

25. The non-transitory computer-readable storage medium of claim 21, wherein the determining comprises inferring a time period during which at least a portion of the set of predicted requests are likely to be received.

26. The non-transitory computer-readable storage medium of claim 21, wherein the operations further comprise:
receiving the first calendar data at least one of periodically, at a predefined time, on demand, or in response to determining that an event has been detected.

27. A communication device, comprising:
a memory; and
at least one processor, communicatively coupled to the memory, that facilitates execution of at least one computer-executable component to at least:
facilitate a transmission of first calendar data to a network device of a communication network, wherein the first calendar data is indicative of an availability of a subscriber of the communication device and is utilized to facilitate a first allocation of a first subset of a set of servers within the communication network to process a request from the communication device and a second allocation of a second subset of the set of servers to process another request from another communication device that does not share second calendar data with the network device, wherein the second calendar data is indicative of another availability of another subscriber of the other communication device; and
subsequent to the first allocation, direct the request to the communication network, subsequent to transmission of the first calendar data, wherein the first subset of the set of servers are determined to have a first start-up delay that is greater that a second start-up delay of the second subset of the set of servers.

28. The communication device of claim 27, wherein the at least one processor further facilitates the execution of the at least one computer-executable component to receive a response from the first subset of the set of servers.

29. The communication device of claim 27, wherein the at least one processor further facilitates the execution of the at least one computer-executable component to facilitate the transmission of the first calendar data to the network device at least one of periodically, at a predefined time, on demand, or in response to determining that an event has been detected.

30. The communication device of claim 27, wherein the first calendar data is utilized to determine a time period during which a likelihood that the communication device will direct the request to the network device satisfies a defined criterion.

31. A method, comprising:
receiving, by a system comprising a processor, a first request transmitted from a first device that has shared, prior to the receiving, calendar data indicative of an availability associated with a subscriber of the first device, wherein a first subset of a set of network servers to process the first request has been determined, based on the calendar data, prior to receiving the first request; and
receiving a second request transmitted from a second device that has not shared with the system, prior to the receiving the second request, other calendar data indicative of another availability associated with another subscriber of the second device, wherein a second subset of the set of network servers is determined to process the second request, and wherein the first subset of the set of network servers are determined to perform a start-up operation at a slower rate than the second subset of the set of network servers.

32. The method of claim 31, further comprising:
directing the first request to the first subset of the set of network servers, wherein the first request is processed by the first subset of the set of network servers and a response to the first request is provided to the first device.

33. The method of claim 31, further comprising:
receiving the calendar data from the first device at least one of periodically, at a predefined time, on demand, or in response to determining that an event has been detected.

34. The method of claim 33, further comprising:
determining a time period associated with the receiving based on analyzing the calendar data.

35. The method of claim 34, further comprising:
facilitating power management of the first subset of the set of network servers based on the time period.

* * * * *